(12) United States Patent
Matsubara et al.

(10) Patent No.: US 6,845,363 B1
(45) Date of Patent: *Jan. 18, 2005

(54) POS TERMINAL, METHOD OF CONTROLLING THE POS TERMINAL, POS SYSTEM USING THE POS TERMINAL, AND INFORMATION STORAGE MEDIUM

(75) Inventors: Yoshihiro Matsubara, Chino (JP); Yukihiro Mikami, Shiojiri (JP); Chris Belk, Ipswich, MA (US)

(73) Assignees: Seiko Epson Corporation, Tokyo (JP); The PCMS Group plc, Coventry (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/530,672
(22) PCT Filed: Sep. 2, 1999
(86) PCT No.: PCT/GB99/02899
§ 371 (c)(1),
(2), (4) Date: Jul. 6, 2000
(87) PCT Pub. No.: WO00/14691
PCT Pub. Date: Mar. 16, 2000

(30) Foreign Application Priority Data
Sep. 4, 1998 (GB) ............................................. 9819354

(51) Int. Cl.⁷ .............................................. G06F 17/60
(52) U.S. Cl. ............................. 705/16; 705/21; 705/20; 705/17; 709/221; 714/38; 717/172; 707/203
(58) Field of Search ............................. 705/16, 21, 20, 705/17; 709/221, 217, 219, 220, 212, 216; 235/375; 714/38; 717/168, 172; 707/201, 203

(56) References Cited

U.S. PATENT DOCUMENTS

| 4,729,097 A | 3/1988 | Takaoka et al. |
| 4,788,637 A | 11/1988 | Tamaru |
| 4,841,442 A | * 6/1989 | Hosoyama ................... 705/20 |

(List continued on next page.)

FOREIGN PATENT DOCUMENTS

| EP | 0 176 072 | 4/1986 |
| EP | 0 187 523 | 7/1986 |

(List continued on next page.)

OTHER PUBLICATIONS

Abcede, Angel, "The POS promise: ready to deliver? (point-of-sale systems)(includes directory of suppliers) (Cover Story)", National Petroleum News, Bolume: 86, No.: 2, p.: 30(8), Feb. 1994.*

Steward, Shawn; Self–serve customers; Cellular Business, vol. 12; No. 7; pp. 40–54; Jul. 1995.

Primary Examiner—F. Zeender

(57) ABSTRACT

The POS system has at least one POS terminal (101) and a store controller (121) connected to the POS terminal. The POS terminal has a program storage device (107), a program updating device (106), a program executing device (106), a goods information storage device (107) and a goods information updating device (106). The program storage device and the goods information storage device serve to store data in a non-volatile storage device. When the POS terminal (101) is started up, the program updating device and the goods information updating device operate to compare the data stored in the non-volatile storage device (107) and the data stored in the store controller (121). If the program and the goods information stored in the non-volatile storage device is incorrect or older than those stored in the store controller, the program updating device and the goods information updating device serve to read the program and the goods information from the store controller and store the read program and goods information in the non-volatile storage device.

22 Claims, 5 Drawing Sheets

U.S. PATENT DOCUMENTS

| | | |
|---|---|---|
| 4,843,547 A | 6/1989 | Fuyama et al. |
| 5,088,051 A | 2/1992 | Forsythe et al. |
| 5,155,837 A | 10/1992 | Liu et al. |
| 5,155,847 A * | 10/1992 | Kirouac et al. ............. 709/221 |
| 5,256,863 A | 10/1993 | Ferguson et al. |
| 5,367,635 A | 11/1994 | Bauer et al. |
| 5,386,512 A | 1/1995 | Crisman et al. |
| 5,393,965 A | 2/1995 | Bravman et al. |
| 5,421,009 A | 5/1995 | Platt |
| 5,430,877 A | 7/1995 | Naylor |
| 5,483,465 A | 1/1996 | Grube et al. |
| 5,495,610 A | 2/1996 | Shing et al. |
| 5,510,979 A | 4/1996 | Moderi et al. |
| 5,535,407 A | 7/1996 | Yanagawa et al. |
| 5,612,527 A | 3/1997 | Ovadia |
| 5,649,114 A * | 7/1997 | Deaton et al. ................. 705/14 |
| 5,717,595 A | 2/1998 | Cherrington et al. |
| 5,745,705 A | 4/1998 | Iguchi |
| 5,758,326 A | 5/1998 | Ishikawa |
| 5,794,214 A | 8/1998 | Ebina et al. |
| 5,802,496 A | 9/1998 | Uchiyama |
| 5,812,668 A * | 9/1998 | Weber ......................... 705/16 |
| 5,873,069 A * | 2/1999 | Reuhl et al. ................. 235/375 |
| 5,895,452 A | 4/1999 | Lum |
| 5,924,078 A | 7/1999 | Naftzger |
| 5,956,489 A | 9/1999 | San Andres et al. |
| 5,974,396 A | 10/1999 | Anderson et al. |
| 5,978,772 A | 11/1999 | Mold |
| 5,987,426 A | 11/1999 | Goodwin |
| 6,003,008 A | 12/1999 | Postrel et al. |
| 6,014,636 A | 1/2000 | Reeder |
| 6,144,848 A * | 11/2000 | Walsh et al. ................. 235/379 |
| 6,173,311 B1 | 1/2001 | Hassett et al. |

OTHER PUBLICATIONS

| | | | |
|---|---|---|---|
| EP | 0 533 343 A2 | 3/1993 | |
| JP | 4-165428 | 6/1992 | |
| JP | 10143569 A * | 5/1998 | ........... G06F/17/60 |
| WO | WO 98/19247 | 5/1998 | |

\* cited by examiner

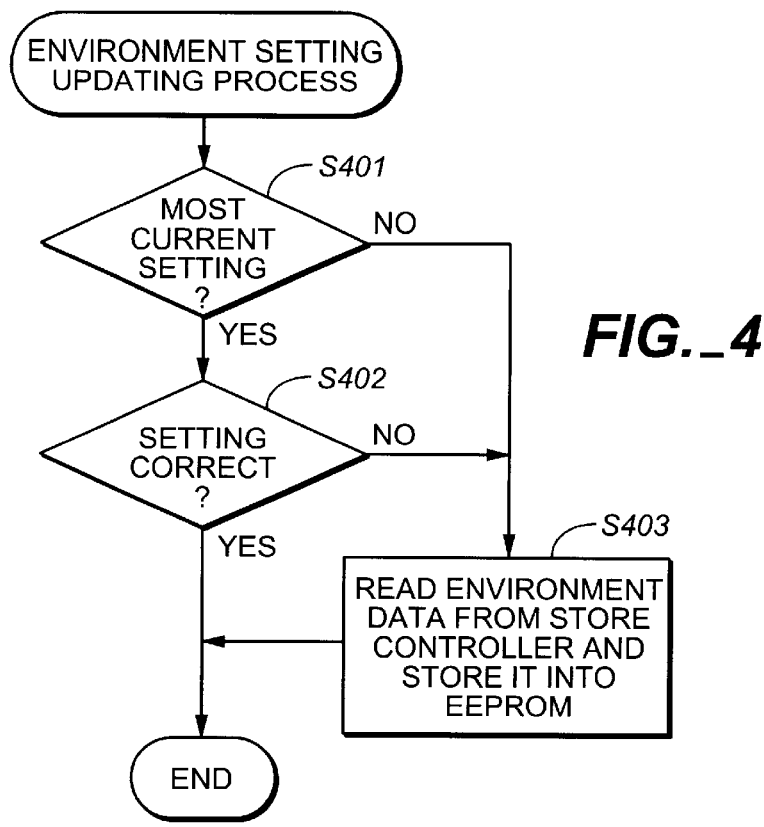
FIG._4
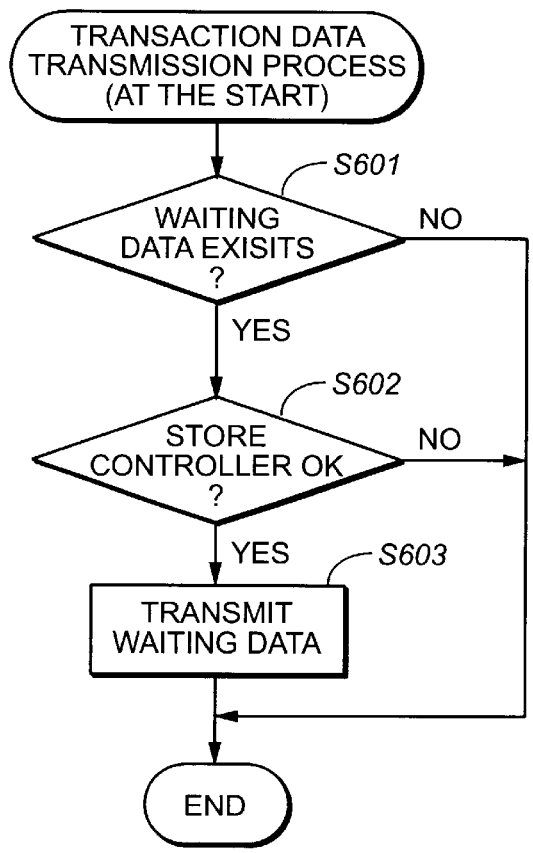
FIG._6

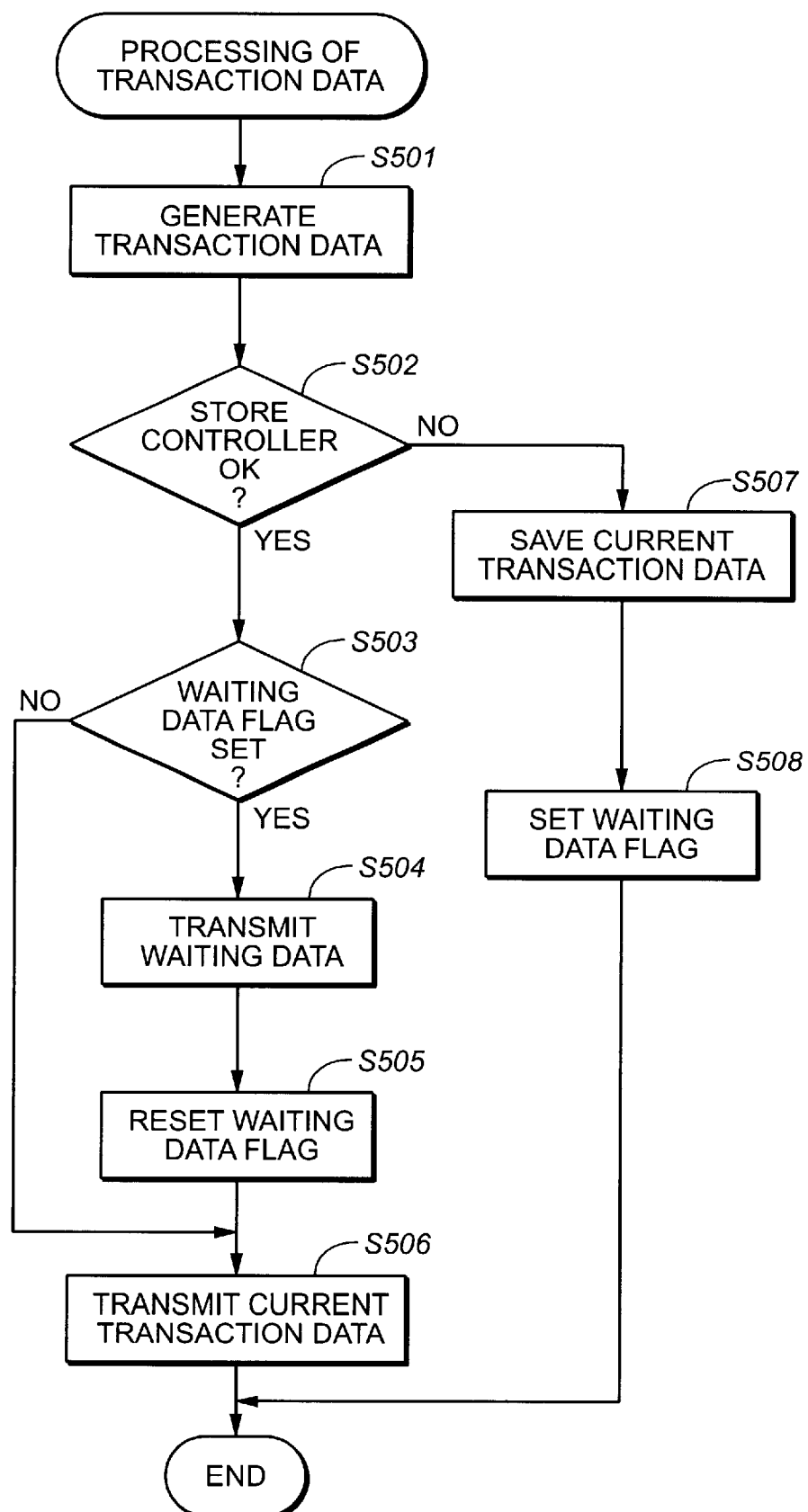
FIG._5

POS TERMINAL, METHOD OF CONTROLLING THE POS TERMINAL, POS SYSTEM USING THE POS TERMINAL, AND INFORMATION STORAGE MEDIUM

BACKGROUND OF THE INVENTION

1. Technical Field of the Invention

The present invention relates to a so-called POS terminal (POS: Point Of Sales). More particularly, the invention is concerned with a POS terminal which is easy to manage and operable independently of a store controller connected thereto via a communication line and which can automatically update the program to be executed, contents of a goods information look up (Price Look-Up; PLU) data base, and environment data such as information concerning construction of a peripheral device connected to the POS terminal and information concerning communication settings such as the baud rate, and which performs resending of transaction data after a failure or trouble that has occurred in the store controller or in the communication line is solved. The invention also relates to a POS system having such a POS terminal, a method of controlling the POS terminal, and a data storage medium storing a program implementing the control method.

2. Description of the Related Art

A POS system having a POS terminal and a store controller connected thereto has been conventionally used. The POS system receives, through a bar code scanner or a keyboard, various kinds of information such as goods codes identifying items of commercial goods, quantities, discounts, corrections and so forth. Upon receipt of such information, the POS terminal generates sales data such as transaction data, and sends the sales data to the store controller. The store controller stores the sales data and uses the same for the purpose of, for example, accounting calculation.

The transaction data includes data such as the times at which the transaction is started and ceased, the name of the operator operating the POS terminal, and so on, in addition to the data such as the codes of the items of sold commercial goods, the quantities sold, discounts, corrections and so forth. The sales data includes, besides the transaction data, a plurality of kinds of data such as the grand total monetary amount of the sales.

The store controller has a goods information look-up data base which permits retrieval of goods information in accordance with the codes assigned to the respective items of commercial goods. The POS terminal forms the transaction data on the basis of goods information obtained from the goods information look-up data base. Devices such as printing apparatuses, e.g., a printer, and input devices, e.g., a bar code reader or a keyboard, are also connected to the POS terminal. Various kinds of information concerning such peripheral devices, e.g., specifications and communication baud rates, are stored in and managed by the store controller.

Thus, the store controller is required to store two types of information: the administrative information necessary for the operation of the POS system and transaction data generated as a result of operation of the POS system.

In this type of POS system, it is desirable that the POS terminal be inexpensive and yet capable of easily performing administration of operations such as updating of programs which run on the POS terminal.

Hitherto, so called dumb terminals and terminals operable independently of the store controller such as intelligent terminals have been used as the POS terminals.

In the system employing a dumb terminal, all the transaction data are managed by the store controller. The dumb terminal serves only to enable the operator to input commands for processes to be performed by the store controller and to run a program for displaying the results of the processes. Thus, most processes including generation of transaction data are executed by the store controller.

In contrast, when the POS system employs an independently operable terminal such as a computer loaded with an OS (Operating System) such as Windows® (registered trade mark owned by Microsoft Corporation), storage and administration of the transaction data are performed both by the POS terminal and the store controller. The process for generating the transaction data is executed by the POS terminal.

Known POS systems using these POS terminals have the following advantages and disadvantages depending on the type of a POS terminal.

A POS system using dumb terminals as the POS terminals can be set up with reduced initial costs by virtue of the low cost of the POS terminals, and permits easy updating and management of programs because the programs implementing most major processes such as generation of transaction data are executed by the store controller. However, the POS terminals become completely inoperable in the event of failure or trouble occurring in the store controller itself or in the network which interconnects the POS terminals and the store controller. In such an event, accounting processes of the stores or shops have to be suspended.

In contrast, a POS system employing independently operable POS terminals loaded with an OS such as Windows® can maintain the POS terminals alive and operable, even in the event of a failure or trouble occurring in the store controller itself or in the network which interconnects the POS terminals and the store controller, because the transaction data can be stored and managed both by the terminals and the store controller. This type of POS system, however, requires much time and costs for maintaining and updating programs, because the program for generating the transaction data is stored and executed by the respective POS terminals. Consequently, the cost of administrating the system is high. Furthermore, the cost of initial installation is also high because computers capable of incorporating an OS such as Windows® are generally expensive.

OBJECTS OF THE INVENTION

The present invention is intended to overcome these problems of the known art. Accordingly, an object of the present invention is to provide a POS terminal which is operable independently of a store controller and yet easy to manage by virtue of functions for automatically updating data such as programs to be executed, goods information, and environment data including the information concerning the specifications of peripheral devices and setting information, e.g. the communication baud rate. The primary object also encompasses provision of a POS system incorporating this POS terminal, as well as a method of controlling the POS terminal and a data storage medium.

It is also an object of the present invention to provide a POS terminal implemented by an inexpensive NC (Network Computer) having a hardware architecture that is standardized in accordance with the JAVA language and the JAVA OS, as well as to a POS system incorporating the POS terminal, a method of controlling the POS terminal, and a data storage medium.

SUMMARY OF THE INVENTION

In accordance with the first aspect of the invention, there is provided a POS terminal connectable to a store controller, comprising: program storage means having non-volatile storage means storing a computer program for controlling the operation of the POS terminal; program updating means for comparing, at the time of startup of the POS terminal, the computer program stored in the program storage means with the computer program stored in the store controller and for reading the computer program stored in the store controller and storing the read computer program in the program storage means when the result of the comparison shows that the computer program stored in the program storage means is faulty or older than the computer program stored in the store controller; and program executing means for executing the computer program stored in the program storage means.

According to the present invention, the program storage means serves to store a program in a non-volatile storage means, while the program updating means operates, at the time of startup of the POS terminal, so as to compare the program stored in the program storage means and the program stored in the store controller. If the program stored in the program storage means is faulty or older than the program stored in the store controller, the program updating means reads the program from the store controller and stores the read program in the program storage means. The program executing means executes the thus stored program.

The POS terminal comprises goods identification code inputting means for inputting codes identifying items e.g. commercial goods; goods information storage means for holding, by storing in the non-volatile storage means provided in the program storage means, goods information which correspond to the goods identification codes input by the goods code inputting means; and goods information updating means. The goods information updating means compares, at the time of startup of the POS terminal, the goods information stored in the goods information storage means with goods information stored in the store controller. The updating means also reads goods information stored in the store controller and stores the read goods information in the first goods information storage means when the result of the comparison shows that the goods information stored in the goods information storage means is faulty or older than the goods information stored in the store controller. The POS terminal further comprises sales data generating means for generating transaction data, based on the goods information stored in the goods information storage means.

Thus, the present invention provides an easy-to-administrate POS terminal that can operate independently of the store controller even in the event of a failure or trouble in the store controller or in the communication line between the POS terminal and the store controller. The present invention also permits automatic updating of the program to be executed and of the goods information necessary for the sales, simply by updating the goods information stored in the store controller.

In accordance with a preferred embodiment of the invention, the POS terminal further comprises means for reading updated goods information into the POS terminal, when an updating process is conducted in the store controller such as by alteration, correction or addition of goods information, during execution of the computer program by the POS terminal, and means for storing the updated goods information in a second non-volatile storage means. In this embodiment the POS terminal has sales data generating means for generating sales data such as transaction data, based on the updated goods information.

With these features, updated goods information formed as a result of a change, correction or addition of goods information performed in the store controller, can be stored in a short time in the second non-volatile storage means, without requiring rewriting of data in the first non-volatile storage means such as a flash EEPROM. It is therefore possible to continue, by using an NC or the like as the POS terminal, the sales operation on the basis of the most current goods information, even in the event of a trouble occurring in, for example, the store controller of the POS system.

In accordance with another preferred embodiment, the POS terminal further comprises: terminal identification code setting means for setting a code which uniquely identifies a respective POS terminal; first environment data storage means for generating environment information including information concerning the specification of a peripheral device connected to the POS terminal or setting information such as the baud rate used for communication, and for storing the environment information in a non-volatile storage means together with the POS terminal identification code; and environment data transmitting means for transmitting the environment data to the store controller. The store controller has second environment data storage means for storing, in non-volatile storage means, environment data from each POS terminal in accordance with the code which identifies the respective POS terminal. The POS terminal further includes environment data editing means for enabling an editorial process on the individual environment data including correction and change of the data and addition to the data, and environment data updating means for storing the edited environment data in both the first and the second environment data storage means. The POS terminal further has environment data updating means for comparing, at the time of startup of the POS terminal, the environment data stored in the first environment data storage means with environment data concerning the POS terminal stored in the second environment data storage means in the store controller. The updating means also reads the environment data stored in the store controller and stores the read environment data in the first environment data storage means when the result of the comparison shows that the environment data stored in the first environment data storage means is faulty or older than the environment data stored in the second environment data storage means.

According to the invention, the environment data includes a code which identifies each POS terminal and information concerning the specifications of a device connected to the POS terminal. The environment data is stored both in the environment data storage means of the POS terminal and the second environment data storage means of the store controller. The setting of the environment data is possible both from the POS terminal and the store controller, and the updated environment data is employed in the transaction performed by the POS terminal when the POS terminal is started the next time.

With this feature of the invention, the POS terminal having any trouble occurring therein can easily be replaced with another unit of POS terminal. In such a case, the new unit of POS terminal can easily read and store the settings of peripheral devices connected thereto, simply by storing the identification code of the old POS terminal unit in the terminal identification code storage means of the new unit of POS terminal. Thus, the administration of the POS terminal is further facilitated.

By using such a POS terminal as described above in a POS system in which one or more POS terminals are connected to a store controller, an easy-to-administrate, highly reliable POS system is provided which incorporates a POS terminal operable independently of the store controller and capable of automatically updating the program to be executed and updating also goods information and environment information concerning a device connected to the POS system.

In accordance with a second aspect of the invention, there is provided a method of controlling a POS terminal for use in communication with a store controller. The POS terminal includes a program storage means including non-volatile storage means storing a controlling computer program and first goods information storage means for storing in the non-volatile storage means, goods information corresponding to codes which identify items of goods. This method has the following steps: comparing the computer program stored in the program storage means with the computer program stored in the store controller, and reading the computer program stored in the store controller and storing the read computer program in the program storage means when the result of the comparison shows that the computer program stored in the program storage means is faulty or older than the computer program stored in the store controller; inputting the codes identifying items of commercial goods; storing goods information which correspond to the inputted goods identification codes; comparing the goods information stored in the first goods information storage means with goods information stored in the store controller, and reading the goods information stored in the store controller and storing the read goods information in the first goods information storage means when the result of the comparison shows that the goods information stored in the first commercial goods storage means is faulty or older than the goods information stored in the store controller; and generating transaction data based on the goods information corresponding to the goods identification code and stored in the goods information storage means.

In accordance with a preferred embodiment of the control method, when the POS terminal has updated goods information storage means for storing, in a second non-volatile storage means, goods information updated during the operation of the POS terminal, the method comprises the steps of: receiving, when an updating process is conducted in the store controller during the operation of the POS terminal, such as alteration, correction or addition of goods information, the updated goods information; storing, in the second non-volatile storage means, the received updated goods information; and generating sales data such as transaction data, based on the received updated goods information.

In accordance with another preferred embodiment of the present invention, the method of controlling the POS terminal employs environment data storage means for storing, in a non-volatile storage means, a code which identifies the POS terminal and information concerning specifications or settings of a peripheral device connected to the POS terminal. The method further includes the steps of: setting the code for identifying the POS terminal; generating, on the POS terminal, information concerning the specifications of the peripheral device connected to the POS terminal or information including the baud rate for communication with the peripheral device, and storing the environment information in the non-volatile storage means together with the POS terminal identification code; and transmitting the environment data to the store controller. The method further includes the steps of: comparing, at the time of startup of the POS terminal, the environment data stored in the environment data storage means with environment data concerning the POS terminal stored in the store controller, and reading the environment data stored in the store controller and storing the read environment data in the environment data storage means when the result of the comparison shows that the environment data stored in the environment data storage means is faulty or older than the environment data stored in the store controller; and starting the POS terminal using the read environment data.

In accordance with a third aspect of the invention, there is provided a computer-readable information storage medium storing a computer program which implements a control method according to the second aspect of the invention as explained in the preceding paragraphs. It is possible to easily distribute or sell the information storage medium as independent item of goods, separately from the hardware such as the POS terminal and the POS system incorporating the POS terminal. The program stored on this storage medium, when executed on the POS terminal of the invention or the POS system of the invention incorporating the POS terminal, implements the POS terminal and POS system, as well as the control method, in accordance with the present invention.

BRIEF DESCRIPTION OF THE DRAWINGS

In the drawings, wherein like reference symbols refer to like parts:

FIG. 2 is a flowchart illustrative of the program updating process which is executed when power supply to the POS terminal of the present invention is turned on.

FIG. 4 is a flowchart showing a process for updating settings of environment executed by the POS terminal in accordance with the present invention.

FIG. 5 is a flow chart illustrating the procedure of processing transaction data in the POS terminal according to an embodiment of the invention.

FIG. 6 is a flow chart illustrating a transaction data transmission process according to an embodiment of the invention.

DETAILED DESCRIPTION OF THE INVENTION

Figure 1:
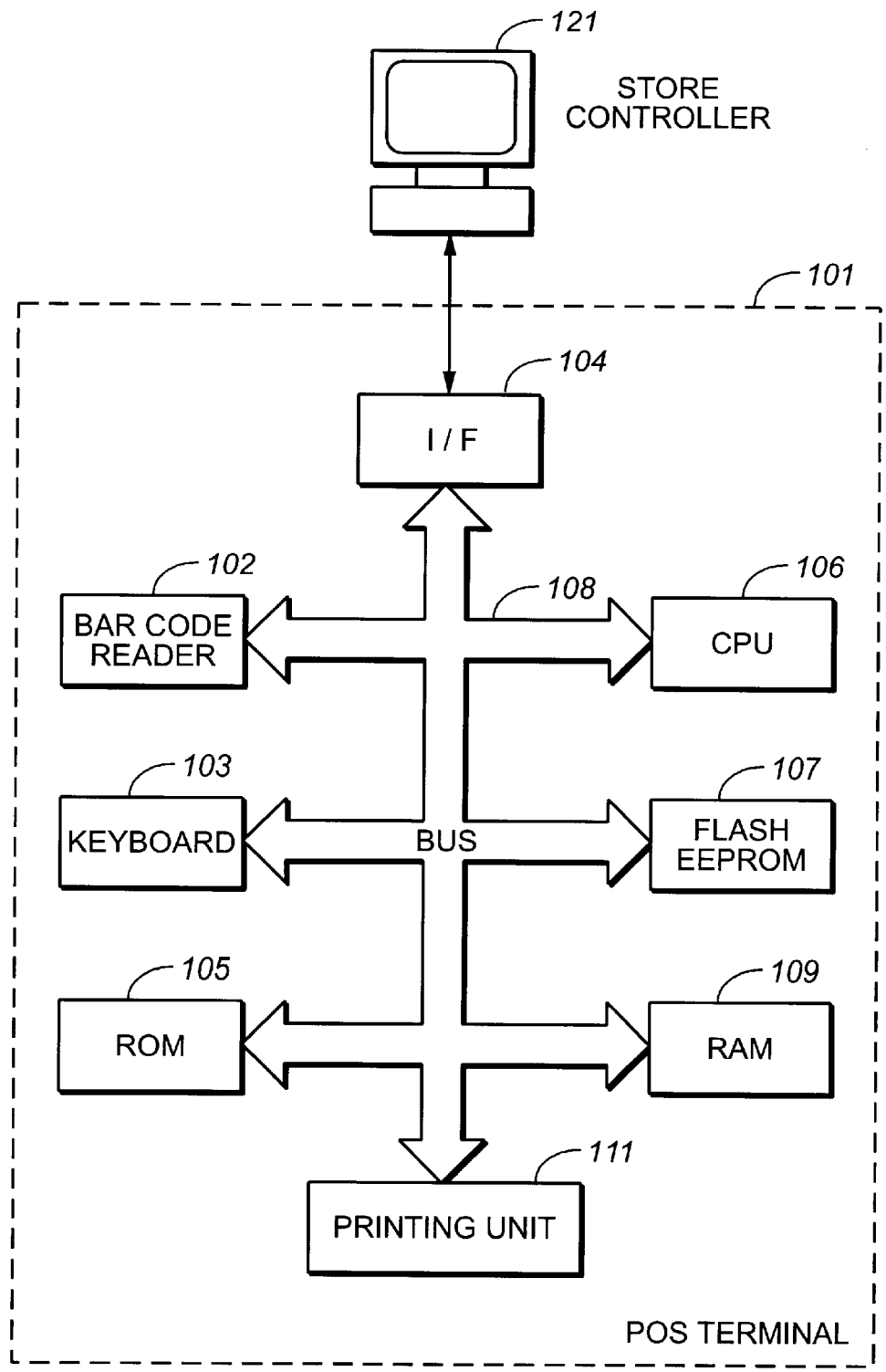
FIG. 1 is a block diagram schematically showing the basic arrangement of an embodiment of the present invention.

Referring to FIG. 1 which is a block diagram showing the basic arrangement of the embodiment, a POS system in accordance with the present invention has a POS terminal 101 comprising an NC, and a store controller 121. The POS terminal 101 and the store controller 121 are connected to each other for mutual communication. For instance, a serial communication line or an Ethernet communication line is used for the mutual communication.

Although only one POS terminal is shown in FIG. 1, it will be clear that an arbitrary number of POS terminals may be connected to the single store controller 121. A computer network having a plurality of POS terminals and one or more store controllers can easily be built up when an Ethernet communication line is employed.

The POS terminal 101 includes a bar code reader 102, a keyboard 103, an interface 104, a ROM 105, a CPU 106, a flash EEPROM 107, a RAM 109, and a printing unit 111. These components are interconnected through a bus 108.

Information such as goods codes indicative of the items of goods, quantities of each item of goods and so forth are input through the bar code reader 102 or the keyboard 103. The bar code reader 102 reads the goods codes indicative of items of commercial goods from bar codes pasted or printed on the goods. The keyboard 103 enables the operator to enter various types of information such as the number of each item of goods, the operator's name, and so forth, as well as to correct data which has been input. Entering by the keyboard 103 is also available when the bar code reader 102 fails to read the bar code. In general, serial communication lines establishing a serial interface such as RS-232C are used instead of the bus 108 shown in FIG. 1, for the purpose of connecting the bar code reader 102, keyboard 103, and the printing unit 111 to the main part of the POS terminal 101.

Thus, the bar code reader 102 and the keyboard 103 serve as goods code inputting means.

The interface 104 serves as a transmitting/receiving device which undertakes exchange of data, messages and commands between the POS terminal 101 and the store controller 121. For instance, the store controller 121 stores various kinds of information such as programs to be executed by the POS terminal 101, a data base of, for example, commercial goods information, and environment information including specifications of the peripheral devices such as the printing unit 111 and the bar code reader 102 connected to the POS terminal 101. Such information is read by the POS terminal 101 from the store controller 121 through the interface 104. Similarly, transaction data generated in the POS terminal 101 is transmitted to the store controller 121 through the interface 104.

The ROM 105 serves as a data storage medium storing a kind of loader program which is executed by the CPU 106 when the power supply to the POS terminal is turned on. Thus, the CPU 106 executes the program stored in the ROM 105 in response to the turning-on of the power supply to the POS terminal. As a result of the execution of this loader program, operation programs, goods information, and other data are read from the store controller 121 through the interface 104 and are stored in the flash EEPROM 107. The operation programs thus stored in the flash EEPROM are executable by the POS terminal 101.

More specifically, the operation programs stored in the flash EEPROM 107 serve to implement a process for forming transaction data based on the data entered through the bar code reader 102 and the keyboard 103 and for transmitting the transaction data to the store controller 121. The operation programs also implement a process for operating the printing unit 111 to print receipts and/or other forms.

Thus, the flash EEPROM 107 serves as a data storage medium for storing programs to be executed by the CPU 106, and also as a program storage means which stores such programs in a non-volatile manner.

The RAM 109 serves as a temporary storage device for the CPU 106. If the printing unit 111 is equipped with a flash EEPROM (not shown), the CPU 106 can also access this flash EEOROM through the bus 108 or above mentioned serial interface.

The flash EEPROM 107 and the flash EEPROM, if any, of the printing unit 111 can serve as program storage means, goods information storage means and updated goods information storage means, and environment data storage means, respectively. The RAM 109 here can serve as a temporary storage device used for changing contents of the flash EEPROMs 107 and 111.

The non-volatile storage devices used in the POS terminal 101 and the printing unit 111 may be flash EEPROMs, hard disks, magneto-optical disks or other peripheral storage devices.

The store controller 121 and peripheral storage devices such as hard disks connected directly or indirectly via network communication lines thereto also serve as a data storage medium which stores the programs of the invention to be executed by the CPU 106.

Figure 2:
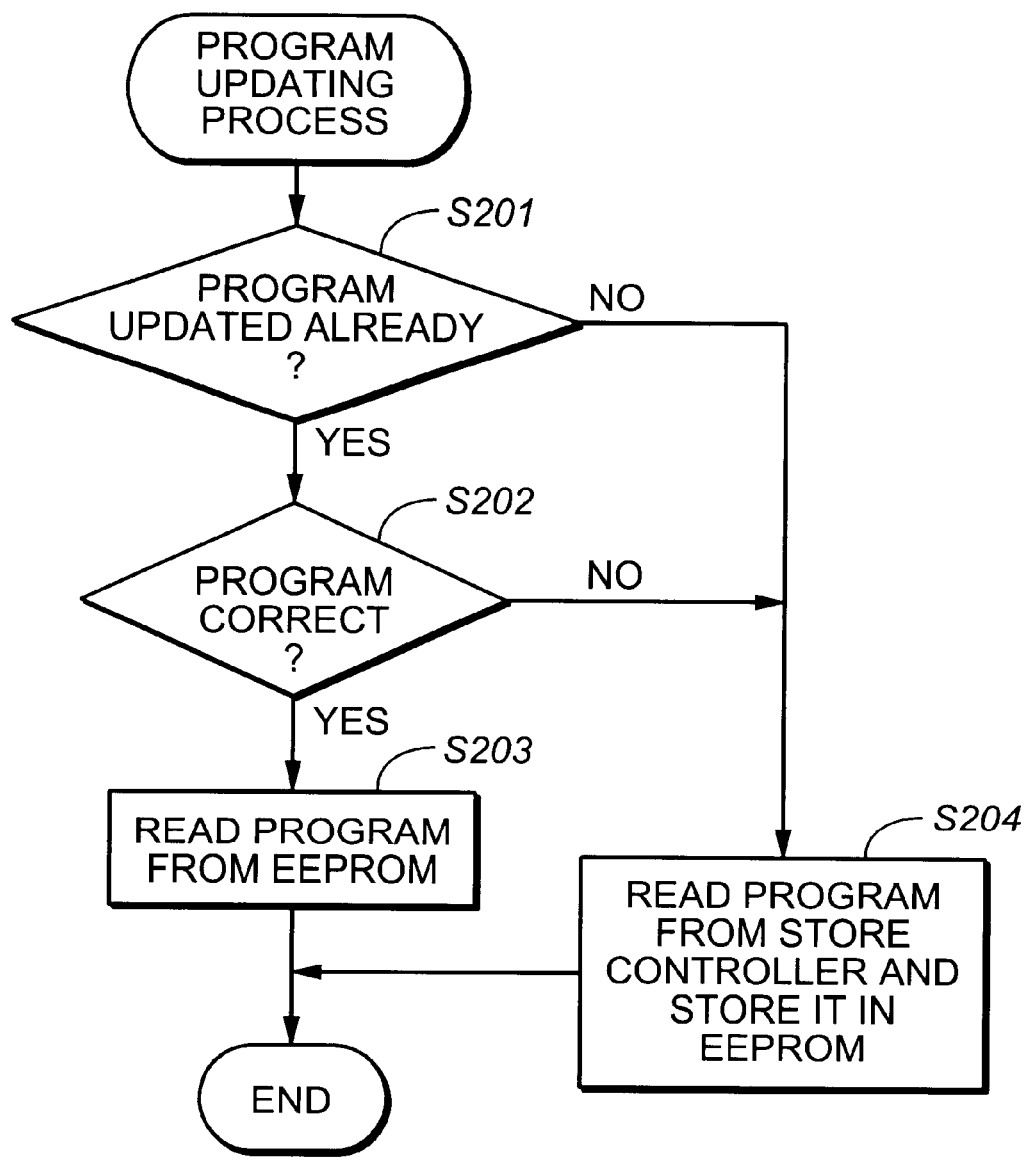

FIG. 2 is a flowchart showing a program updating process which is executed when the power supply to the POS terminal is turned on. The updating process is executed as follows.

The CPU 106 executes the loader program stored in the ROM 105 in response to the turning-on of the power supply. The loader program stored in the ROM 105 is an IPL (Initial Program Loader) which, when executed, implements the program updating process.

The CPU 106 determines whether or not the program stored in the flash EEPROM 107 is the most current or updated program, by comparing the program version stored in the flash EEPROM 107 with the program version which is to be executed by the POS terminal and which has been stored in the store controller 121 (Step S201). The arrangement may be such that the code indicative of the program version is included in the binary data of the program code which is stored in the flash EEPROM 107, so that the determination as to whether the program has been updated can be made by comparing this version code with a code indicative of the version of the program which is stored in the store controller and read through the interface 104.

If the program has been updated or is the latest one, i.e., when the answer Yes is given to the question posed in Step S201, the process advances to determine whether the program stored in the flash EEPROM 107 is correct (Step S202). Whether or not the program is correct can be determined, for example, through the following procedure. The program code is considered as being binary data, and a check sum of the binary data is stored in the flash EEPROM 107 at a predetermined address. This check sum is compared with a corresponding one calculated from the program code which is now stored in the flash EEPROM 107. Whether or not the program is correct is determined based on whether or not these two check sum values coincide with each other.

When the program is correct, i.e., when the answer Yes is given to the question in Step S202, the CPU 106 reads the program stored in the flash EEPROM 107 and stores the read program in the RAM 109 (Step S203), thus completing the process.

In contrast, when the program has not yet been updated, i.e., when the answer No is given in response to the question posed in Step S201, as well as when the program stored in the flash EEPROM 107 is not correct, i.e., a faulty program and thus an answer NO is given in Step S212, the CPU 106 reads the most current program for the POS terminal from the store controller 121 through the interface 104 and stores the read program in the flash EEPROM 107 (Step S204). Step S204 also performs a function equivalent to that performed in Step S203. Step S204 may further execute calculation of the check-sum or other error correction codes such as ECC and storage of the calculation result as required.

Figure 3:
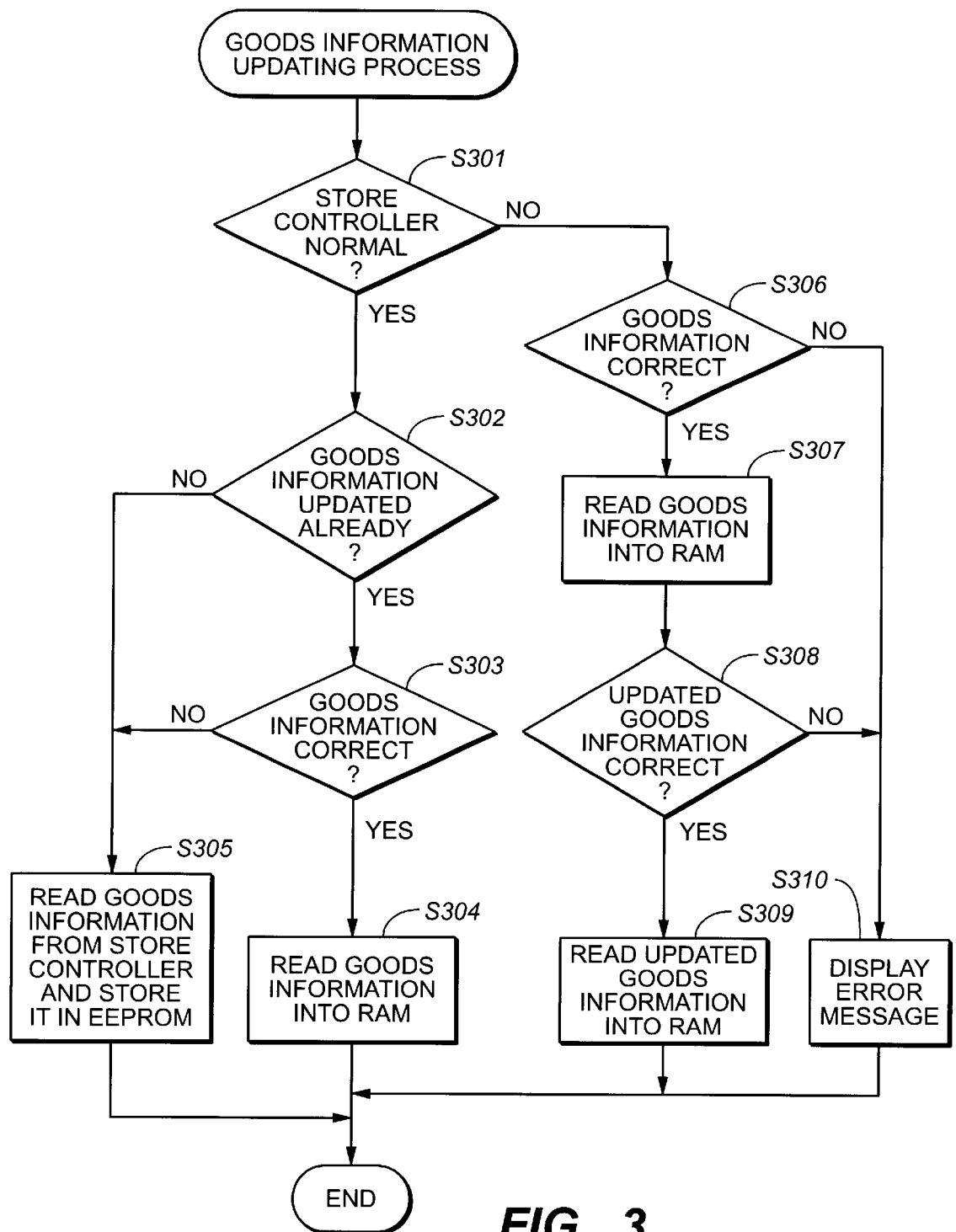
FIG. 3 is a flowchart showing a goods information updating process executed by the POS terminal in accordance with the present invention.

FIG. 3 is a flowchart illustrative of the process which is executed in the POS terminal of the invention subsequent to the flow of FIG. 2, for the purpose of updating the goods information. The goods information updating process is as follows.

This process may generally be implemented through the execution of the IPL as in the case of the program updating process. This, however, is not exclusive and the update of the goods information may be implemented by the program loaded in the RAM 109 as an operation program through the process shown in FIG. 2.

The CPU 106 examines the state of communication between the POS terminal 101 and the store controller 121 and also the state of the goods information stored in the store controller 121 through the interface 104 (Step S301). The examination can be performed by well known methods such as sending to the store controller 121 a predetermined command inquiring a predetermined status of the store controller including validity of the stored goods information. When a normal state of communication is confirmed, i.e., when the answer Yes is given in Step S301, the CPU 106 determines whether or not the goods information stored in the EEPROM 107 has been updated, by comparing the version of the goods information stored in the EEPROM 107 with the version of the goods information to be used by the POS terminal and stored in the store controller 121 (Step S302).

The arrangement may be such that a code indicative of the version of the goods information is included in the binary data of the code indicative of the goods information which is stored in the flash EEPROM 107, so that the determination as to whether the goods information has been updated can be made by comparing this version code with a code indicative of the version of the goods information which has been stored in the store controller and read through the interface 104.

If the goods information has been updated, i.e., when the answer Yes is given to the question posed in Step S302, a determination is made as to whether the goods information stored in the flash EEPROM 107 is correct or faulty.

Whether or not the goods information is correct can be determined, for example, through the following procedure. The goods information is considered as being stored as binary data, and the check sum of the binary data is stored in the flash EEPROM 107 at a predetermined address. This check sum is compared with that calculated from the goods information which is presently stored in the flash EEPROM 107. Whether or not the goods information is correct is determined based on whether or not these two check sum values coincide with each other.

When the goods information is correct, i.e., when the answer Yes is given to the question in Step S303, the CPU 106 reads the goods information stored in the flash EEPROM 107 and stores the read goods information in the RAM 109 (Step S304), thus completing the process.

In the event that the goods information has not yet been updated (answer "No" in Step S302) or that the goods information is incorrect or faulty (answer "No" in Step S303), the CPU 106 reads the most current goods information for the POS terminal from the store controller 121 via the interface 104 and stores the read goods information in the flash EEPROM 107 (Step S305). In the meantime, updated goods information, which has been stored in a second non-volatile storage means such as the flash EEPROM of the printing unit 111 is deleted. In Step S305, the goods information updated and stored in the flash EEPROM 107 is also stored in the RAM 109, as in Step S304. Step S305 may also execute the process for calculating the check sum or other known error correction codes and store the calculation result in the memory devices.

If any unusual state is found in Step S301 in regard to the communication with the store controller or the data base containing the goods information provided therein (answer "No" in Step S301), the CPU 106 confirms (Step S306) the goods information stored in the flash EEPROM 107 and, if the answer is Yes, reads the goods information into the RAM 109. The CPU 106 further confirms (Step S308) the updated goods information and, if the answer is Yes, reads the updated goods information into the RAM 109.

In case of any abnormality in Step S306 or S307, a predetermined error message is displayed (Step S310) to terminate the operation, since no further process is executable.

Incidentally, the updated goods information mentioned above is the result of a goods information update process performed by the store controller. When the store controller alters and/or corrects existing goods information and/or adds new goods information, the POS terminal 101 receives corresponding updated goods information and stores it in non-volatile storage means by updated goods information reading means. For the faster operation, the updated goods information sent to the POS terminal 101 includes only updated portions of the goods information. The POS terminal 101, therefore, generates sales data such as transaction data based on both the goods information originally stored in the POS terminal 101 and the updated goods information subsequently sent from the store controller 121 and stored separately from the original goods information. Where the present text refers to first and second goods information storage means for storing the original goods information and the updated goods information, respectively, this is only for ease of description. As will be understood by those skilled in the art, for the purpose of the present invention it is not critical whether the first and second goods information storage means are implemented as respective storage areas of the same storage means or as separate storage means. It is only important that the updated goods information be stored separate from the original goods information.

FIG. 4 is a flowchart showing a process for updating the settings of environment, executed subsequent to the goods information updating process which is executed by the POS terminal upon the turning-on of the power supply. The process for updating the settings of environment is as follows.

The CPU 106 determines whether or not the environment data stored in the flash EEPROM has been updated, by comparing the version of the environment data in the flash EEPROM with the environment data for the POS terminal stored in the store controller 121 (Step S401). In order to enable the determination as to whether the environment data has been updated, the version of the environment data is included in the environment data which is stored in, for example, the flash EEPROM 107 and is compared with the version of environment data read from the store controller 121 through the interface 104.

If the environment data has been updated, i.e., if the answer Yes is given to the question posed in Step S401, the process advances to determine whether or not the environment data stored in, for example, the flash EEPROM 107 is correct. This determination may be conducted by acquiring a code indicative of the connected device and comparing the code with the stored environment data. Alternatively, the connected device is initialized in accordance with the stored environment data, and whether or not the environment data is correct is determined based on whether or not the initialization is successful.

If the environment data is correct, i.e., when the answer Yes is given in Step S402, the CPU 102 ceases this process.

In contrast, if the environment data has not been updated (answer "No" in Step S401) or if the environment data is incorrect or faulty (answer "No" in Step S402), the CPU 106 reads the most current environment data from the store controller 121 through the interface 104 and stores the read data in, for example, the flash EEPROM 107 (Step S403), thus terminating the process.

Referring to FIG. 5, the processing of transaction data will now be described in detail. FIG. 5 is a flow chart illustrating the procedure of processing transaction data. As described earlier, the procedure shown in this flow chart is executed by the CPU 106 according to the program stored in the flash EEPROM 107. The process is started when information is input via the bar code reader 102 or the keyboard 103.

In Step S501, transaction data is generated from input information. The transaction data may be temporarily stored in a RAM or in a nonvolatile memory such as an EEPROM so that the data is maintained even when the power supplied to the terminal is shut down. In this embodiment, when transaction data is temporarily stored, after being generated, in a nonvolatile memory such as an EEPROM, the data is preferably stored in a ring-buffer fashion because the memory area is limited in size. In this ring-buffer storage technique, oldest transaction data is overwritten with latest transaction data. Because the EEPROM has an upper limit as to the number of rewriting operations, it is desirable to also use a RAM as a cache memory, if necessary.

In Step S502, the status of communication with the store controller 121 is checked. If communication is possible, then the process goes to Step S503 in which it is checked whether or not there is any transaction data which should have been transmitted to the store controller 121 but which has not been transmitted yet.

Such a check is necessary because there is a possibility that some transaction data, generated before the current transaction, remained in the terminal without having been transmitted because of, for example, a failure in communication with the store controller 121. If there is such transaction data waiting to be transmitted (referred to as waiting data hereinafter), this waiting data is transmitted first. The checking of whether or not there is waiting data is accomplished by examining a waiting data flag. More specifically, if the waiting data flag is in the true state, then it is determined that there is waiting data.

If there is waiting data, the process goes to Step S504, and the waiting data is transmitted to the store controller 121. After completion of the transmission of the waiting data, the process goes to Step S505 to reset the waiting data flag. Then in Step S506, the current transaction data is transmitted. On the other hand, if it is determined in Step S503 that there is no waiting data, then the process jumps to Step S506, and the current transaction data is transmitted, and then the process is completed.

On the other hand, if Step S502 determines that communication with the store controller 121 fails, then the transaction data is saved in Step S507, i.e., the current transaction data become waiting data. The saving step is performed in such a manner that the transaction data is stored in a nonvolatile memory such as a power-backed-up RAM or an EEPROM, and an indication of the presence of waiting data is given. The waiting data may be stored in a dedicated waiting data storage area or in a dynamically allocated storage area. For instance, in case of temporary storage of transaction data in a ring buffer as mentioned above, this ring buffer could be used for saving waiting data. Two pointers to the ring buffer could be employed in this case, a first one pointing to the last transaction data sent to the store controller, and a second one pointing the last transaction data stored in the ring buffer. The area between the locations pointed to by the two pointers would then define a dynamic waiting data storage area. In such an embodiment using pointers, a particular waiting data flag as an indication of the presence of waiting data, could be dispensed with. Whether or not the size of the dynamic waiting data storage area is zero could be used to determine whether or not there is waiting data to be processed. If the two pointers point to the same memory location, i.e., the size of dynamic waiting data storage area is zero, it means that all transaction data have been transmitted to the store controller. Thus, the term "waiting data flag" is used herein in a broad sense covering all means allowing to detect whether or not there is waiting data to be processed. It is to be noted that if a ring buffer is used for both temporarily storing the transaction data and saving waiting data, Step S507 only involves appropriate setting of the second pointer.

Then in Step S508, the waiting data flag is set to indicate that there are waiting data, i.e., transaction data that remained without having been transmitted. The waiting data flag is preferably stored in a predetermined area in a nonvolatile memory. After setting of the waiting data flag, the processing of the transaction data is completed.

The temporarily stored transaction data may be deleted in response to a delete command issued by the store controller 121. In this case, it is desirable that the store controller 121 issues the delete command after saving the transaction data in an external storage device (not shown) such as a hard disk drive or a magneto-optic disk connected to the store controller 121. Note that waiting data is not deleted, when a delete command is issued. In this case, it is desirable that status data transmitted to the store controller in response to the delete command includes a flag indicating whether or not there is remained transmission-waiting transaction data. If the waiting data storage area is separate from the temporary buffer used for temporarily storing the transaction data, all data stored in the buffer can be deleted in response to a delete command. If the temporary buffer includes the waiting data storage area, however, as explained above, the data stored in the waiting data storage area must be kept undeleted even if the delete command has been issued. In such case, when the terminal receives the delete command, the terminal deletes all data in the temporary buffer except for those in the dynamic waiting data storage area defined by the two pointers.

When the POS terminal 101 is started, it is desirable that a transaction data transmission process be performed according to the procedure shown in FIG. 6. FIG. 6 is a flow chart illustrating the procedure of the transaction data transmission process which is performed first when the POS terminal is powered on, according to the present embodiment of the invention.

In Step S601, it is checked whether or not there is waiting data. If there is no waiting data, the process is completed. In the case there is waiting data, the process goes to Step S601, and the status of communication with the store controller 121 is checked. If communication is impossible, the process is completed. On the other hand, if communication is possible, the process goes to Step S603 to transmit transaction data stored as waiting data. After that, the waiting data flag is reset (if the waiting data flag rather than pointers is used to indicate the existence of waiting data).

Although an NC is used as the POS terminal in the described preferred embodiment, this is only illustrative and a general purpose personal computer loaded with a general purpose operating system, for example, Windows® may be used as the POS terminal. A POS terminal easy to administrate can also be obtained with such a personal computer.

A description will now be given of a procedure of administrating information which is employed when a flash EEPROM is used as the non-volatile storage means.

The storage area of a flash EEPROM is divided into a plurality of blocks which is the minimum unit for an erasing operation. In other words, it is necessary to erase a whole block for erasing a part of the block.

In general, once data is written in a certain area of a flash EEPROM, it is prohibited to perform overwriting in the area without performing an erasing process.

As mentioned above, erasing of information written in the EEPROM is effected on a block basis. In general, erasing of a block of information stored in the EEPROM takes a considerable time and further the number of erasing processes is limited to several tens of thousand to several hundreds of thousand times, unlike other types of non-volatile storage means such as hard disks.

It is therefore advisable that, when an EEPROM is used as information storage means, the processes are limited as much as possible to writing processes only and that erasing processes are avoided unless it is absolutely necessary.

Partial change/update of information stored in the flash EEPROM requires that the data of the block containing the information to be changed or updated is read into a volatile storage means such as a RAM, and the read information is changed or updated, followed by writing it back into the EEPROM. There is a risk that journal data or transaction data is lost, in the event that a failure or trouble occurs in the system during the final step of writing the changed or updated data back into the EEPROM. This problem is not negligible in view of the role and significance of the data.

To deal with this problem, the present invention adopts the following procedure for the purpose of administrating the storage of information in the EEPROM.

First of all, it is to be noted that the information is stored on a "file" basis. Each file contains a plurality of bytes indicative of the information to be stored, the number of the bytes making up the information to be stored, the file name which identifies the file, the date on which the file was created or last amended, and so forth.

To this end, the storage area in the flash EEPROM is divided into two areas: namely, an FAT (File Allocation Table) area and a data area. Information such as the file name, the number of bytes of the file, the date of creating the file and so forth are stored in the FAT area, while the information contained in the file is stored in the data area. The FAT area also stores other kinds of information such as the address of any defective sector which may exist in the flash EEPROM.

When an instruction is given for storing a file in the flash EEPROM, the file name, the number of bytes and the date on which the file was made, as well as the information contained in the file, are acquired from the instruction. The file name, the number of bytes and the date on which the file was made are assembled into unit information which is added to the data stored in the FAT area, while the information itself contained in the file is added to the data stored in the data area. Thus, the process for storing a file is executed without necessitating erasing of the flash EEPROM.

The method of adding data to the FAT area and the data area may be such that the storage of the data in the FAT area is started from a lower-order address towards higher-order addresses of the flash EEPROM, whereas the storage in the data area is executed starting from a higher-order address towards a lower-order addresses. Writing in this flash EEPROM is prohibited when the size of the border or vacancy between both areas has become smaller than a predetermined number of bytes.

Processing journal data and transaction data is basically limited only to addition, and deletion of information is not included. Correction of wrong information may appear to require deletion of data. In case of journal data and transaction data, however, it is necessary that a record of such a correction is stored. Thus, all the journal data and the transaction data are recorded on a file basis, and all kinds of input information including corrections are recorded in order to show the history of the data.

When the size of the vacancy between the highest-order address of the FAT area and the lowest-order address of the data area has become smaller than a predetermined value in terms of the number of bytes, it is necessary to shift the information from the flash EEPROM to, for example, a host computer or the store controller, because storage of further information may be impossible. This, however, does not cause any critical problem because the storage area size of ordinarily available most cost-efficient flash EEPROM is large enough to accommodate journal data and transaction data which is produced during one day in an accounting machine such as a cash register; for example, the following operation is performed.

That is, data of one whole day is collectively copied to and stored in the host computer or the store controller after business hours, e.g., in the night-time, and the whole information in the flash EEPROM is erased after completion of the copying/storage operation.

If it is expectable that the above-mentioned vacancy in the flash EEPROM falls down below a predetermined number of bytes even during business hours, it is advisable that the above-mentioned predetermined number of bytes is set to a comparatively large value, and a suitable warning is given to inform the operator that only a small area is left available for storage. The operator can then conduct the copying/storage operation while temporarily stopping routine operation of the cash register. Further it is effective that the operator performs the copying/storage operation while the cashier lane is temporary stopped for supplying a paper roll for printing receipts to the printer.

Thus, administration of information in the flash EEPROM is conducted by using the FAT. Any kind of information, such as journal data and its history, transaction data and its history, a price look up table (PLU), environment setting information, programs used in the POS terminal, and so forth can be stored in the flash EEPROM.

The described procedure may be employed regardless of whether the flash EEPROM is installed in the POS terminal or in the printing device such as a printer.

As will be understood from the foregoing description, the present invention offers the following advantages.

First of all, it is to be understood that the present invention provides an easy-to-administrate POS terminal which can operate independently of the store controller even in the event of a failure or trouble in the store controller or in the communication line between the POS terminal and the store controller, and which permits automatic updating of the goods information to be executed simply by updating of the goods information stored in the store controller.

Secondly, the present invention provides a POS terminal which can automatically update goods information from a database in the store controller and which permits retrieval of goods information.

Thirdly, in accordance with the invention, the POS terminal having any trouble occurring therein can easily be replaced with another unit of POS terminal. In such a case, the new POS terminal can easily read and store the settings of peripheral devices connected thereto, simply by storing the identification of the old POS terminal unit in the terminal identification code storage means of the new unit of POS terminal. This feature also serves to facilitate the administration of the POS terminal.

The present invention also provides a POS terminal incorporating an NC, as well as a POS system including such POS terminals. The present invention further provides a method of controlling the POS terminal. In accordance with the present invention, provided also is an information storage medium storing the program, which can be distributed or sold as an independent item of goods, separately from the hardware such as the POS system, POS terminal and the store controller. The program stored on the data storage medium of the present invention, when executed by the POS terminal in the POS system, implements the above-described control method of the present invention.

Although the invention has been described in terms of an embodiment, it is to be understood that the described embodiment is only illustrative and is not intended to limit the scope of the present invention. Those skilled in the art will obviously modify or change the embodiment without departing from the spirit of the present invention, by substituting each or all the elements of the invention with equivalents. Clearly, such modifications and changes fall within the scope of the present invention.

What is claimed is:

1. A POS terminal connectable to a store controller, comprising:
   (a) program storage means having a first non-volatile storage means storing a computer program for controlling the operation of the POS terminal;
   (b) program updating means for comparing, at the time of startup of said POS terminal, a first version of the computer program stored in said program storage means with a second version of the computer program stored in said store controller and for reading the second version of the computer program and storing the read second version of the computer program in said program storage means when a comparison between the first and second versions of the computer program shows that the first version of the computer program stored in said program storage means is older than the second version of the computer program;
   (c) program executing means for executing the most recent version of the computer program stored in said program storage means after the program comparison is performed;
   (d) goods identification code inputting means for inputting codes identifying items of commercial goods;
   (e) goods information storage means for holding, by storing in the first non-volatile storage means, a first version of goods information which corresponds to the goods identification codes and which includes at least one of prices or names of the items of the commercial goods;
   (f) goods information updating means for comparing the first version of goods information stored in said goods information storage means with a second version of goods information stored in said store controller and for reading the second version of goods information and storing the read second version of goods information in said goods information storage means when a comparison between the first and second versions of goods information shows that the first version of goods information stored in said goods information storage means is incorrect or older than the second version of goods information;
   (g) sales data generating means for generating sales data including at least transaction data, based on the goods identification code inputted by said goods identification code inputting means and on the correct or most recent version of goods information stored in said goods information storage means;
   (h) environment data storage means for storing environment data including, at least, information concerning a peripheral device connected to said POS terminal, the environmental data being stored together with an identification code identifying the POS terminal; and
   (i) environment data updating means for comparing a first version of the environment data stored in said environment data storage means with a second version of the environment data concerning said POS terminal stored in said store controller and for reading the second version of the environment data and storing the read second version of the environment data in said environment data storage means when a comparison between the first and second versions of the environment data shows that the first version of the environment data stored in said environment data storage means is incorrect or older than the second version of the environment data.

2. A POS terminal according to claim 1, further comprising:
   (j) updated goods information receiving means for enabling said POS terminal to receive updated goods information, when an updating process including alteration, correction and/or addition of goods information is conducted by said store controller during execution of the computer program by said POS terminal; and
   (k) updated goods information storage means having a second non-volatile storage means for storing the updated goods information received by said updated goods information receiving means;
   wherein said sales data generating means generates said sales data while additionally using said updated goods information.

3. A POS terminal according to claim 2, further comprising:
   (l) terminal identification code setting means for setting the code which identifies the POS terminal;
   (m) environment data transmitting means for transmitting the environment data to said store controller; and
   (n) environment data editing means for editing environment data including at least one of correction or change of the data and addition to the data, edited environment data being stored in said first or second non-volatile storage means.

4. A POS terminal according to claim 3, further comprising:
   (o) verifying means responsive to said sales data generating means for checking whether or not data transmission to the store controller is possible;
   (p) sales data storing means for storing said sales data when said verifying means has determined that the data transmission is not possible; and (q) sales data transmission means for transmitting sales data generated by said sales data generation means and sales data stored by said sales data storing means to said store controller when said verifying means has determined the data transmission is possible.

5. A POS terminal according to claim 4, wherein said verifying means is also responsive to the startup of the POS terminal, and said sales data transmission means is adapted to transmit stored sales data, if any, to said store controller at the time of startup of the POS terminal when said verifying means has determined that the data transmission is possible.

6. A POS system, comprising:

a store controller; and a POS terminal comprising:

(a) program storage means having a first non-volatile storage means storing a computer program for controlling the operation of the POS terminal;

(b) program updating means for comparing, at the time of startup of said POS terminal, a first version of the computer program stored in said program storage means with a second version of the computer program stored in said store controller and for reading the second version of the computer program and storing the read second version of the computer program in said program storage means when a comparison between the first and second versions of the computer program shows that the first version of the computer program stored in said program storage means is older than the second version of the computer program;

(c) program executing means for executing the most recent version of the computer program stored in said program storage means after the program comparison is performed;

(d) goods identification code inputting means for inputting codes identifying items of commercial goods;

(e) goods information storage means for holding, by storing in the first non-volatile storage means, a first version of goods information which corresponds to the goods identification codes and which includes at least one of prices or names of the items of the commercial goods;

(f) goods information updating means for comparing the first version of goods information stored in said goods information storage means with a second version of goods information stored in said store controller and for reading the second version of goods information and storing the read second version of goods information in said goods information storage means when a comparison between the first and second versions of goods information shows that the first version of goods information stored in said goods information storage means is incorrect or older than the second version of goods information;

(g) sales data generating means for generating sales data including at least transaction data, based on the goods identification code inputted by said goods identification code inputting means and on the correct or most recent version of goods information stored in said goods information storage means;

(h) environment data storage means for storing environment data including, at least, information concerning a peripheral device connected to said POS terminal, the environmental data being stored together with an identification code identifying the POS terminal; and (i) environment data updating means for comparing a first version of the environment data stored in said environment data storage means with a second version of the environment data concerning said POS terminal stored in said store controller and for reading the second version of the environment data and storing the read second version of the environment data in said environment data storage means when a comparison between the first and second versions of the environment data shows that the first version of the environment data stored in said environment data storage means is incorrect or older than the second version of the environment data; and wherein the store controller is connected to said POS terminal.

7. A method of controlling a POS terminal for use in communication with a store controller, said POS terminal having a program storage means including first non-volatile storage means storing a computer program for controlling said POS terminal and goods information storage means for holding, by storing in the first non-volatile storage means, goods information corresponding to codes which identify items of goods, said method comprising the steps of:

(a) comparing a first version of the computer program stored in said program storage means with a second version of the computer program stored in said store controller, and reading the second version of the computer program and storing the read second version of the computer program in said program storage means when a comparison between the first and second versions of the computer program shows that the first version of the computer program stored in said program storage means is older than the second version of the computer program;

(b) executing the most recent version of the computer program stored in said program storage means after step (a) is performed;

(c) inputting codes identifying items of commercial goods;

(d) storing a first version of goods information which correspond to the inputted goods identification codes in said goods information storage means;

(e) comparing the first version of goods information stored in said goods information storage means with a second version of goods information stored in said store controller, and reading the second version of goods information and storing the read second version of goods information in said goods information storage means when a comparison between the first and second versions of goods information shows that the first version of goods information stored in said goods information storage means is incorrect or older than the second version of goods information;

(f) generating transaction data based on the inputted goods identification code and on the correct or most recent version of goods information stored in said goods information storage means;

(g) generating environment data including information concerning at least one of the specifications of a peripheral device connected to said POS terminal, and storing the environment data in an environment data storage means together with an identification code identifying the POS terminal;

(h) comparing a first version of the environment data stored in said environment data storage means with a second version of the environment data concerning said POS terminal stored in said store controller, and reading the second version of the environment data and storing the read second version of the environment data in said environment data storage means when a comparison between the first and second versions of the environment data shows that the first version of the environment data stored in said environment data storage means is incorrect or older than the second version of the environment data.

8. A method according to claim 7, further comprising the steps of:

(i) receiving updated goods information, when an updating process is conducted in the store controller by alteration, correction and/or addition of goods information during the operation of said POS terminal;

(j) storing, in a second non-volatile storage means, the received updated goods information; and (k) generating sales data including at least transaction data while additionally using said received updated goods information.

9. A method according to claim 8, further comprising:

(l) setting the code for identifying the POS terminal;

(m) transmitting the environment data to said store controller; and (n) starting up the POS terminal using the correct or most recent version of the environment data.

10. A method according to claim 9, further comprising the steps of:

(o) checking whether or not transmission of sales data to the store controller is possible;

(p) transmitting sales data generated in said sales data generation step when step (o) reveals that transmission is possible; while (q) storing said sales data when step (o) reveals that transmission is not possible; and (r) transmitting sales data stored in step (q), if any, next time step (o) is executed.

11. A method according to claim 10, wherein sales data stored in step (q), if any, is transmitted at the time of startup of the POS terminal when said transmission of sales data to the store controller has been determined to be possible.

12. A computer-readable information storage medium storing a computer program which implements a control method for controlling a POS terminal for use in communication with a store controller, said POS terminal having program storage means for storing the computer program in a non-volatile manner and goods information storage means for holding, by storing in a first non-volatile storage means, goods information corresponding to codes which identify items of goods, and environment data storage means for holding, by storing in said first or a second non-volatile storage means, a code identifying the POS terminal and information which includes, at least, information concerning the specifications of a peripheral device connected to the POS terminal or information concerning the setting of the peripheral device, said control method comprising the steps of:

(a) comparing a first version of the computer program stored in said program storage means with a second version of the computer program stored in said store controller, and reading the second version of the computer program and storing the read second version of the computer program in said program storage means when a comparison between the first and second versions of the computer program shows that the first version of the computer program stored in said program storage means is older than the second version of the computer program;

(b) executing the most recent version of the computer program stored in said program storage means after step (a) is performed;

(c) inputting codes identifying items of commercial goods;

(d) storing a first version of goods information which correspond to the inputted goods identification codes in said goods information storage means;

(e) comparing the first version of goods information stored in said goods information storage means with a second version of goods information stored in said store controller, and reading the second version of goods information and storing the read second version of goods information in said goods information storage means when a comparison between the first and second versions of goods information shows that the first version of goods information stored in said goods information storage means is incorrect or older than the second version of goods information;

(f) generating transaction data based on the inputted goods identification code and on the correct or most recent version of goods information stored in said goods information storage means;

(g) generating the environment data including at least one of information concerning the specifications or the settings of the peripheral device connected to said POS terminal, and storing the environment data in said environment data storage means together with an identification code identifying the POS terminal;

(h) comparing a first version of the environment data stored in said environment data storage means with a second version of the environment data concerning said POS terminal stored in said store controller, and reading the second version of the environment data and storing the read second version of the environment data in said environment data storage means when a comparison between the first and second versions of the environment data shows that the first version of the environment data stored in said environment data storage means is incorrect or older than the second version of the environment data.

13. A storage medium according to claim 12, wherein said POS terminal has updated goods information storage means which holds, by storing in a second non-volatile storage means, any goods information updated during the operation of the POS terminal, and wherein said control method further comprises the steps of:

(i) receiving updated goods information, when an updating process is conducted in the store controller by alteration, correction and/or addition of the goods information during the operation of said POS terminal, the;

(j) storing, in said second non-volatile storage means, the received updated goods information; and (k) generating sales data including at least transaction data, based on the received updated goods information.

14. A storage medium according to claim 13, said control method further comprising the steps of:

(l) setting the code for identifying the POS terminal;

(m) transmitting the environment data to said store controller; and (n) operating the POS terminal using the correct or most recent version of the environment data.

15. A storage medium according to claim 14, wherein said control method further comprises the steps of:
(o) checking whether or not transmission of sales data to the store controller is possible;
(p) transmitting sales data generated in said sales data generation step when step (o) reveals that transmission is possible; while
(q) storing said sales data when step (o) reveals that transmission is not possible; and
(r) transmitting sales data stored in step (q), if any, next time step (o) is executed.

16. A storage medium according to claim 15, wherein said stored sales data, if any, is transmitted at the time of startup of the POS terminal when said transmission has been determined to be possible.

17. A POS terminal connectable to a store controller, comprising:
(a) a program storage medium having a first non-volatile storage medium storing a computer program configured to control the operation of the POS terminal;
(b) a program updater configured to compare, at the time of startup of said POS terminal, a first version of the computer program stored in said program storage medium with a second version of the computer program stored in said store controller and to read the second version of the computer program and store the read second version of the computer program in said program storage medium when a comparison between the first and second versions of the computer program shows that the first version of the computer program stored in said program storage medium is older than the second version of the computer program;
(c) a program executer configured to execute the most recent version of the computer program stored in said program storage medium after the program comparison is performed;
(d) a goods identification code input configured to input codes identifying items of commercial goods;
(e) a goods information storage medium configured to hold, by storing in the first non-volatile storage medium, a first version of goods information which corresponds to the goods identification codes and which includes at least one of prices or names of the items of the commercial goods;
(f) a goods information updater configured to compare the first version of goods information stored in said goods information storage medium with a second version of goods information stored in said store controller and to read the second version of goods information and store the read second version of goods information in said goods information storage medium when a comparison between the first and second versions of goods information shows that the first version of goods information stored in said goods information storage medium is incorrect or older than the second version of goods information;
(g) a sales data generator configured to generate sales data including at least transaction data, based on the goods identification code inputted by said goods identification code input and on the correct or most recent version of goods information stored in said goods information storage medium;
(h) an environment data storage medium configured to store environment data including, at least, information concerning a peripheral device connected to said POS terminal, the environment data being stored together with an identification code identifying the POS terminal; and
(i) an environment data updater configured to compare a first version of the environment data stored in said environment data storage medium with a second version of the environment data concerning said POS terminal stored in said store controller and for reading the second version of the environment data and storing the read second version of the environment data in said environment data storage medium when a comparison between the first and second versions of the environment data shows that the first version of the environment data stored in said environment data storage medium is incorrect or older than the second version of the environment data.

18. A POS terminal according to claim 17, further comprising:
(j) an updated goods information receiver configured to enable said POS terminal to receive updated goods information, when an updating process including alteration, correction and/or addition of goods information is conducted by said store controller during execution of the computer program by said POS terminal; and
(k) an updated goods information storage medium having a second non-volatile storage medium configured to store the updated goods information received by said updated goods information receiver;
wherein said sales data generator generates said sales data while additionally using said updated goods information.

19. A POS terminal according to claim 18, further comprising:
(l) a terminal identification code setter configured to set the code which identifies the POS terminal;
(m) an environment data transmitter configured to transmit the environment data to said store controller; and
(n) an environment data editor configured to edit environment data including at least one of correction or change of the data and addition to the data, edited environmental data being stored in said first or second non-volatile storage medium.

20. A POS terminal according to claim 19, further comprising:
(o) a verifier responsive to said sales data generator configured to check whether or not data transmission to the store controller is possible;
(p) a sales data storing medium configured to store said sales data when said verifier has determined that the data transmission is not possible; and
(q) a sales data transmitter configured to transmit sales data generated by said sales data generator and sales data stored by said sales data storing medium to said store controller when said verifier has determined the data transmission is possible.

21. A POS terminal according to claim 20, wherein said verifier is also responsive to the startup of the POS terminal, and said sales data transmitter is adapted to transmit stored sales data, if any, to said store controller at the time of startup of the POS terminal when said verifier has determined that the data transmission is possible.

22. A POS system, comprising:

a store controller; and a POS terminal comprising:

(a) a program storage medium having a first non-volatile storage medium storing a computer program configured to control the operation of the POS terminal;

(b) a program updater configured to compare, at the time of startup of said POS terminal, a first version of the computer program stored in said program storage medium with a second version of the computer program stored in said store controller and to read the second version of the computer program and store the read second version of the computer program in said program storage medium when a comparison between the first and second versions of the computer program shows that the first version of the computer program stored in said program storage medium is older than the second version of the computer program;

(c) a program executer configured to execute the most recent version of the computer program stored in said program storage medium after the program comparison is performed;

(d) a goods identification code input configured to input codes identifying items of commercial goods;

(e) a goods information storage medium configured to hold, by storing in the first non-volatile storage medium, a first version of goods information which corresponds to the goods identification codes and which includes at least one of prices or names of the items of the commercial goods;

(f) a goods information updater configured to compare the first version of goods information stored in said goods information storage medium with a second version of goods information stored in said store controller and to read the second version of goods information and store the read second version of goods information in said goods information storage medium when a comparison between the first and second versions of goods information shows that the first version of goods information stored in said goods information storage medium is incorrect or older than the second version of goods information;

(g) a sales data generator configured to generate sales data including at least transaction data, based on the goods identification code inputted by said goods identification code input and on the correct or most recent version of goods information stored in said goods information storage medium;

(h) environment data storage means for storing environment data including, at least, information concerning a peripheral device connected to said POS terminal, the environment data being stored together with an identification code identifying the POS terminal; and (i) environment data updating means for comparing a first version of the environment data stored in said environment data storage means with a second version of the environment data concerning said POS terminal stored in said store controller and for reading the second version of the environment data and storing the read second version of the environment data in said environment data storage means when a comparison between the first and second versions of the environment data shows that the first version of the environment data stored in said environment data storage means is incorrect or older than the second version of the environment data; and wherein the store controller is connected to said POS terminal.

\* \* \* \* \*